United States Patent
Doron et al.

(10) Patent No.: US 9,156,389 B2
(45) Date of Patent: Oct. 13, 2015

(54) VACUUM TANK TRAILER DISCHARGE PORT

(71) Applicants: Yuval Doron, College Station, TX (US); Andrew T. Duggleby, College Station, TX (US)

(72) Inventors: Yuval Doron, College Station, TX (US); Andrew T. Duggleby, College Station, TX (US)

(73) Assignee: EXOSENT ENGINEERING, LLC, College Station, TX (US)

( * ) Notice: Subject to any disclaimer, the term of this patent is extended or adjusted under 35 U.S.C. 154(b) by 0 days.

(21) Appl. No.: 14/195,003

(22) Filed: Mar. 3, 2014

(65) Prior Publication Data

US 2014/0251471 A1 Sep. 11, 2014

Related U.S. Application Data

(60) Provisional application No. 61/775,349, filed on Mar. 8, 2013.

(51) Int. Cl.
*B60P 3/22* (2006.01)
*B60P 1/00* (2006.01)

(52) U.S. Cl.
CPC ............ *B60P 3/2205* (2013.01); *B60P 1/00* (2013.01); *B60P 3/2245* (2013.01); *Y10T 137/86236* (2015.04)

(58) Field of Classification Search
CPC ............ B60P 1/00; B60P 3/22; B60P 3/2205; B60P 3/225; B60P 3/2245
USPC ............................ 137/240, 577; 251/144, 155
See application file for complete search history.

(56) References Cited

U.S. PATENT DOCUMENTS

| | | | | | |
|---|---|---|---|---|---|
| 1,509,425 | A | * | 9/1924 | Giffen | 137/878 |
| 4,133,347 | A | * | 1/1979 | Mercer | 137/240 |
| 5,377,715 | A | * | 1/1995 | Andenmatten et al. | 137/240 |
| 5,839,484 | A | * | 11/1998 | Engle | 141/65 |
| 5,878,767 | A | * | 3/1999 | Etling et al. | 137/240 |
| 5,975,111 | A | * | 11/1999 | Galantowicz et al. | 137/240 |
| 2010/0147087 | A1 | * | 6/2010 | Secord | 73/863.86 |

* cited by examiner

*Primary Examiner* — Kevin Lee
(74) *Attorney, Agent, or Firm* — Douglas Baldwin

(57) ABSTRACT

Disclosed is a port system for facilitating mixed solid/liquid content discharge from a portable tank especially vacuum tank trailer, discharge system. The system provides an enlarged sloped tank outlet system that overcomes the deficiencies of convention systems.

10 Claims, 2 Drawing Sheets

VACUUM TANK TRAILER DISCHARGE PORT

CROSS REFERENCE TO RELATED APPLICATIONS

This application claims benefit of Provisional Application Ser. No. 61/775,349 filed Mar. 8, 2013. The contents and disclosures of the application is incorporated herein by reference in its entirety for all purposes.

BACKGROUND

1. Field

Portable tanks, especially vacuum tank trailer, discharge system. A port discharge system for facilitating mixed solid/liquid content discharge from a portable tank.

2. Background

Vacuum tank trailers (and trucks) are increasing engaged in uses in hauling liquids contents with significant solid content. Such trailer are in heavy use in oil and gas operations where high solid content materials are transported to and from well sites. Liquid with solid contents (mud and the like) are often difficult to remove from the tank.

It is customary to discharge tank contents through one or more nominal 4 inch pipe outlets located at the rear bottom of the tank. Generally the contents must be flushed out by water hose from the top opening of the tank. This procedure is time consuming and therefore expensive since it ties up the tank and driver for longer than necessary.

Some trailers tilt as in a dump truck to aid in discharge of the solids containing liquid but they are considerably more expensive than non-tilting tanks.

SUMMARY

The present invention provides an enlarged sloped tank outlet system that overcomes the deficiencies of convention systems.

DESCRIPTION OF THE FIGURES

The Figures represent embodiments of the invention and are not intended to be limiting of the scope of the invention.

FIG. 1 *b* is a rear view of a vacuum tank trailer showing the system of an embodiment of the invention located at the rear bottom of the trailer.

FIG. 1 *c* is an enlarged rear view of a vacuum tank trailer showing the system of an embodiment of the invention located at the rear bottom of the trailer.

DETAILED DESCRIPTION

The tank discharge system of embodiments of the invention comprises a conduit of 6 to 10 inch diameter that attaches to the underside of an elongated circular tank, the conduit having two conjoined members, and the first member configured to mate to the bottom of a tank and the second to be substantially parallel to the long plane of the tank.

Figure 1A:
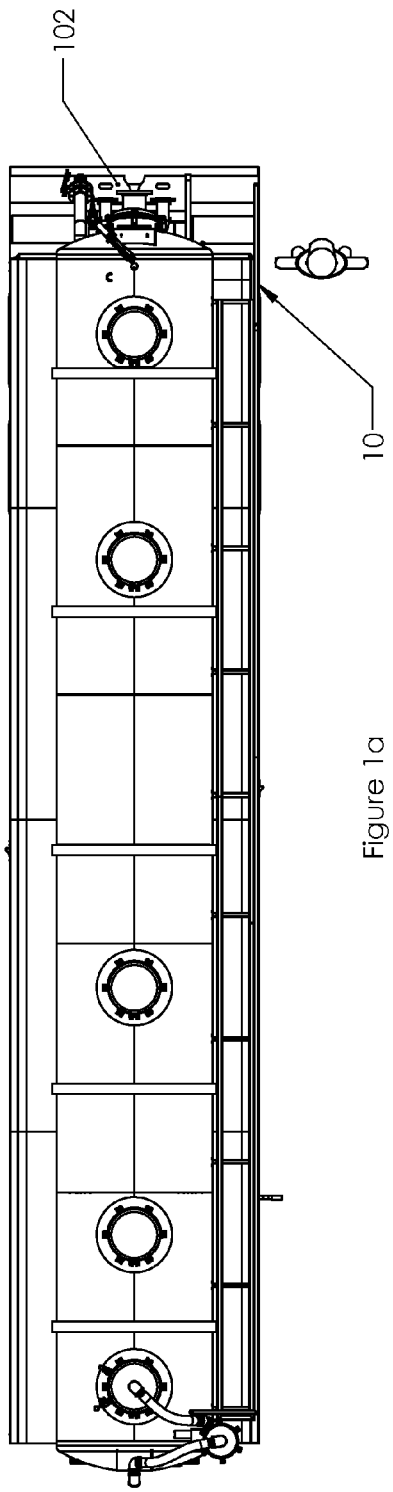
FIG. 1 *a* is a top view of a vacuum tank trailer showing the system of an embodiment of the invention located at the rear bottom of the trailer.
Figure 1C:
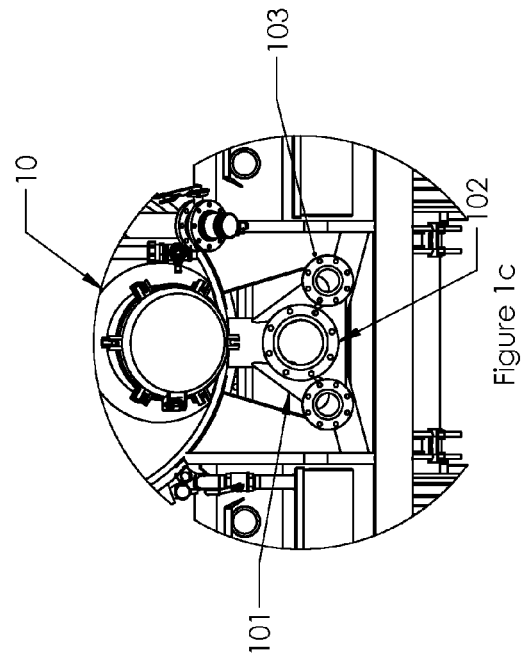
Figure 1B:
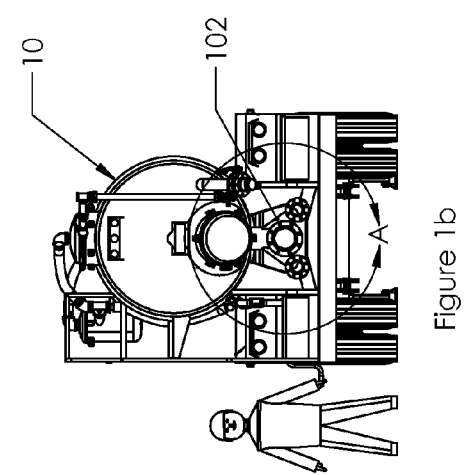
Figure 2B:
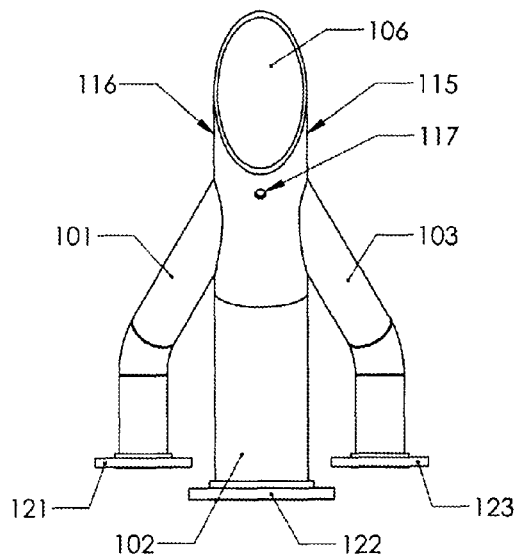
FIG. 2*b* is a top view of the system of an embodiment of the invention.
Figure 2C:
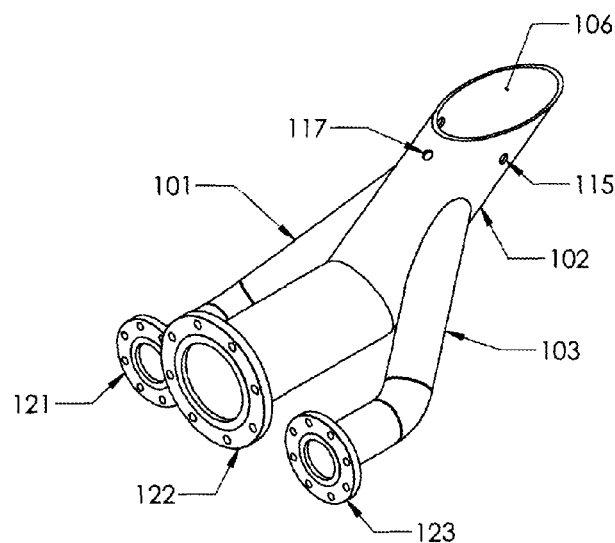
FIG. 2*c* is perspective isometric view of the system of an embodiment of the invention.
Figure 2A:
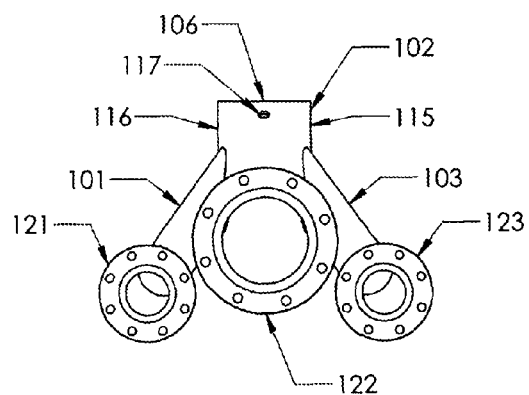
FIG. 2*a* is an end view of the system of an embodiment of the invention.
Figure 2D:
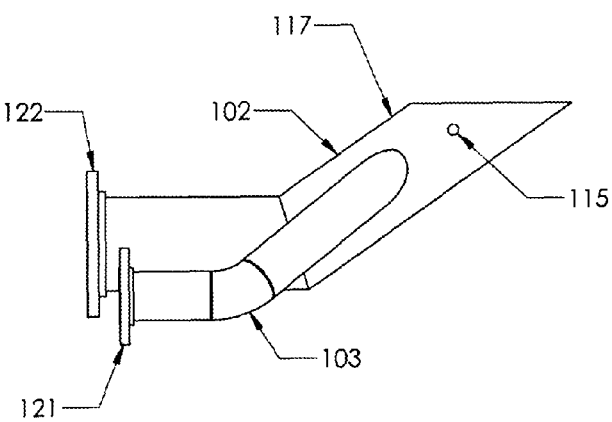
FIG. 2*d* is a side view of the system of an embodiment of the invention.

An exemplary embodiment of the invention is illustrated in the drawings. FIG. 1 *a* is the top side view and FIG. 1 *b* is a rear view of a tank trailer 10, showing the placement of member 102 of an embodiment of the invention. FIG. 1 *c* is an enlarged section of the rear view of tank 10 showing component 102, 101, and 103 of the system.

The FIGS. 2*a*-2*d* show details of the conduit of an embodiment of the invention. Referring to FIGS. 2*a*-2*d*, the principal member 102 comprises two components, one tilted from the vertical that is attached to the underside of the tank at 106, the other configured to be substantially horizontal to the ground (and the long plane of the tank) when the system is attached 9and the tank level). Attachment to the tank is preferably by welding if the system and tank is metal—adhesive if the tank is polymer materials (such as fiberglass). Extending at an angle from the principal member is, in one embodiment, side arms 101 and 105. These are generally 2 to 6 inch nominal diameter conduit. They may be used when the main drain 102 is not needed (as when the liquid content is of low solid content and/or when it is necessary to connect to an existing drain conduit of a smaller diameter than the main drain member 102. Either one or more auxiliary drains (as shown) may be attached. Generally, each member, 102, 101 and 103 will have half flanges, 121,122 and 123 attached to allow valves to be attached. Other suitable connection means may also be used.

There may also be flush ports inserted at several points in the main drain member, for example, at points 115, 116 and 117. These ports can have a nozzle pointing downward in the drain member and a conduit connection (such as a hose connection) to allow water to be sprayed into the member to assist in draining and flushing the drain member.

The embodiment shown is attached at the rear of an elongate tank. The system may also be attached to the side of the tank as necessary, as for example, if the tank is compartmented and a drain or drains are needed along the sides of the tank.

In this specification, the invention has been described with reference to specific embodiments thereof. It will, however, be evident that various modifications and changes can be made thereto without departing from the broader spirit and scope of the invention as set forth in the appended claims. The specification is, accordingly, to be regarded in an illustrative rather than a restrictive sense. Therefore, the scope of the invention should be limited only by the appended claims.

The invention claimed is:

1. A tank discharge system comprising a first conduit member attached to an elongated circular tank trailer having an underside, a topside, a front end, a rear end, a length and a width, the conduit being attached to the underside of the elongated circular tank; a second conduit member attached to the first conduit member wherein the first conduit member is configured to be angled downward from the underside of the tank trailer and the second member configured to be substantially parallel to the long axis of the tank trailer and wherein there are two additional angled conduit members, attached one to either side of the first conduit member that are angled downward at substantially the same angle as the first conduit member and angled outward toward the sides of the tank and having attached to the each of the two angled conduit members parallel angled members that are substantially parallel to the long axis of the underside of the tank trailer.

2. The discharge system of claim 1 wherein the discharge system is attached to the underside of the tank trailer at a location that positions the ends of the second conduit and the ends of the two parallel conduits substantially at the rear end of the tank trailer.

3. The system of claim 1 wherein the first and second conduits are nominal 6 to 10 inch diameter.

4. The system of claim 2 wherein the two additional parallel angled conduits are nominal 2 to 6 inch diameter.

5. The system of claim 1 wherein the tank is a vacuum tank trailer.

6. The system of claim 1 wherein there are ports for attaching nozzle(s) in the conduit.

7. The system of claim 1 wherein the second members and parallel angled members have means to connect valves.

8. A tank trailer having an elongated circular tank, the tank having an underside, a topside, a front end, a back end, a length and a width and a tank discharge system attached to the underside of the tank trailer, the drain system comprising a first conduit member attached to an elongated circular tank trailer having an underside, a topside, a front end, a rear end, a length and a width, the conduit being attached to the underside the elongated circular tank and a second conduit member attached to the first conduit member wherein the first conduit member is configured to be angled downward from the underside of the tank trailer and the second member configured to be substantially parallel the long axis of the tank trailer and wherein there are two additional angled conduit members, attached one to either side of the first conduit member angled downward at substantially the same angle as the first conduit member and having attached to the each of the two angled conduit members parallel angled members that are substantially parallel to the long axis of the underside of the tank trailer.

9. The trailer system of claim 8 wherein the discharge system is attached to the underside of the tank trailer at a location that positions the ends of the second conduit and the ends of two parallel conduits substantially at the rear end of the tank trailer.

10. The trailer system of claim 8 wherein there are ports for attaching nozzle(s) in at least one of the conduits.

* * * * *